Nov. 15, 1966   F. A. KLASEK   3,284,910
TEST PROBE FOR DETECTING MISALIGNMENT OF METAL WORKPIECES
Filed Jan. 20, 1964

INVENTOR
F. A. KLASEK
BY
ATTORNEY 3,284,910
TEST PROBE FOR DETECTING MISALIGN-
MENT OF METAL WORKPIECES
Frank A. Klasek, La Grange Park, Ill., assignor to Western Electric Company, Incorporated, New York, N.Y., a corporation of New York
Filed Jan. 20, 1964, Ser. No. 338,655
2 Claims. (Cl. 33—180)

The present invention relates generally to test probes for detecting misalignment of metal workpieces, and more particularly to test probes for use in conjunction with an electrical control circuit for detecting misalignment of a metal workpiece within a machine. The general objects of the invention are to provide a new and improved test probe of such character.

In the manufacturing and processing of metal parts, there are countless operations in which it is necessary that the part assume a prescribed position. It is therefore necessary to determine prior to the commencement of such operations whether the part is properly positioned. This, of course, could be accomplished by physical observation, but in many instances this is not sufficiently accurate or is not practical for other reasons. One solution is to utilize a suitable detector or test probe. It is desirable that such detectors be simple in construction and utilize the inherent configuration of the part as a basis for detecting improper positioning.

It is therefore an object of the invention to provide a test probe for use in conjunction with an electrical circuit for detecting misalignment of a metal workpiece, which test probe is simple in construction and utilizes an aperture in the workpiece for determining its position, which aperture is inherent in the configuration of the workpiece either during its fabrication or in its final form.

Many metal workpieces are formed, for example, in punch presses in which a punch and die or progressive dies are employed to complete the fabrication. A serious problem in this field is the detection of improper positioning of stock, premature termination of stock, and buckling of stock within the press. These and other failures or inaccuracies must be guarded against in order to avoid costly damage to the dies, to save raw materials, and to increase production by minimizing down-time.

One known detector for detecting misaligned or misfed stock consists of a feeler probe having a coil spring base which is mounted on the ram of the press. On the down-stroke of the ram, the feeler probe contacts the stock and moves therealong laterally of the ram, as is allowed by deformation of the coil spring base. Pilot holes are provided in the stock so that if it is underfed or overfed, such malfunction is indicated by the feeler probe breaking electrical contact with the stock as it passes over such hole or holes. A shortcoming of such detector resides in the fact that it must be mounted on the ram. Consequently, misfed stock may be detected only after the ram has already begun its down-stroke. In high inertia presses it becomes practically impossible to halt the ram in midstroke in order to prevent damage to the dies.

Accordingly, an object of the invention is to provide new and improved test probes for such presses, which test probes may be mounted in the lower die portion of the press and are cooperable with pilot apertures in the stock to detect misfeeds prior to the down-stroke of the press so that the ram may readily be arrested before an operation is completed upon the misfed stock. Another object is to provide new and improved test probes in accordance with the above object, which test probes may detect premature termination of stock, and buckling of stock, as well as improper positioning thereof.

Another known detector involves a probe forming a conductor in an electrical circuit, which probe is movably mounted so that an end portion thereof may pass through a pilot hole in the stock and be received in an electrical socket mounted on the opposite side of the stock. A substantial drawback of this detector is the requirement that portions thereof be mounted on opposite sides of the stock, thus occupying a considerable amount of valuable space within a critical area of the press. In addition, this requirement makes it necessary that one part of the detector either be mounted on the ram or be mounted in a position where it may interfere with the operation of the ram. Further, since the detector utilizes a fixed socket, such socket is prone to clog with metal scraps, common in punch presses, and thus may short out to the stock in which case the detector would indicate proper positioning when in fact the stock may be improperly positioned.

A further object of the invention, therefore, is to provide new and improved test probes for use in a punch press, which test probes may be mounted entirely on one side of the stock, preferably in the lower die portion of the press, and which test probes utilize a pilot hole in the stock as an electrical socket for receiving the test probe, so that an electrical circuit is completed only when the stock is properly positioned within the press.

The above and other objects are accomplished in accordance with the invention by a test probe utilized in conjunction with an electrical circuit. Such test probe includes a first electrically conductive portion mounted in a machine, and electrically insulated therefrom, such that it projects to a position wherein it may abut the surface surrounding a pilot aperture in a properly positioned workpiece. A second and electrically non-conductive portion of the test probe is arranged in alignment with the aperture in a properly positioned workpiece and projects beyond the first portion, the second portion having a cross section no greater than the aperture so that it may be received within the aperture and permit the first portion to abut the surrounding surface of a properly positioned workpiece only. With such a construction, an electrical circuit may be completed through the first portion of the test probe and the metal workpiece only when the second portion is received in the aperture.

In accordance with a preferred embodiment of the invention, the first portion consists of a generally cylindrical body member having an end shaped in the form of a truncated cone, the truncated section of the body member having a diameter less than that of a pilot bore in the workpiece and the body member having an outer diameter substantially larger than that of the bore. The second portion consists of a generally conical insert mounted on the body member to form the apex of the truncated conical end, the greatest diameter of the conical insert being substantially equal to the diameter of the truncated section of the body member. In addition resilient means are provided for mounting the body member in the device and biasing the same to a position in alignment with the bore in a properly positioned workpiece.

With this refined construction, improperly positioned stock will engage the conical insert, which is electrically non-conductive; whereas properly positioned stock will receive the conical insert within the bore and permit the truncated conical end of the body member, which is electrically conductive, to engage the peripheral edges of the bore. Thus an electrical circuit may be completed through the body member and the metal workpiece only when the workpiece is properly positioned so as to receive the conical insert within the bore.

Other objects, advantages and aspects of the invention will become apparent from the following detailed description of a preferred embodiment thereof when taken in conjunction with the appended drawings in which.

Figure 1:
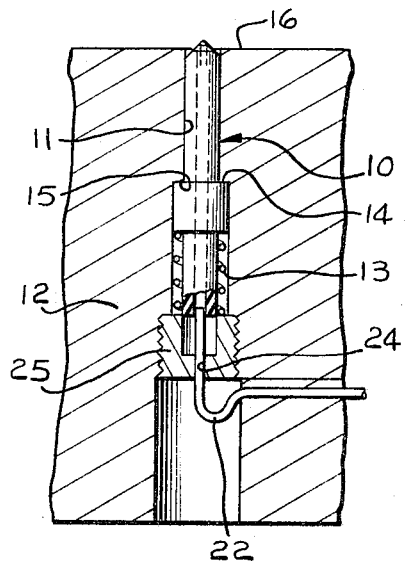
FIG. 1 is a fragmentary elevational view, partly in section, depicting a preferred test probe mounted in the lower die portion of a punch press.

Referring now to the drawings and more particularly to FIG. 1, the test probe, indicated generally by the numeral 10, is preferably slidably received within a guide chamber 11 in the lower die portion 12 of a punch press. The test probe 10 is spring-biased, as by a coil spring 13, so that a shoulder 14 thereon engages a stop 15 when the tip of the probe protrudes a prescribed distance beyond the stock-receiving surface 16 of the lower die portion 12.

Figure 2:
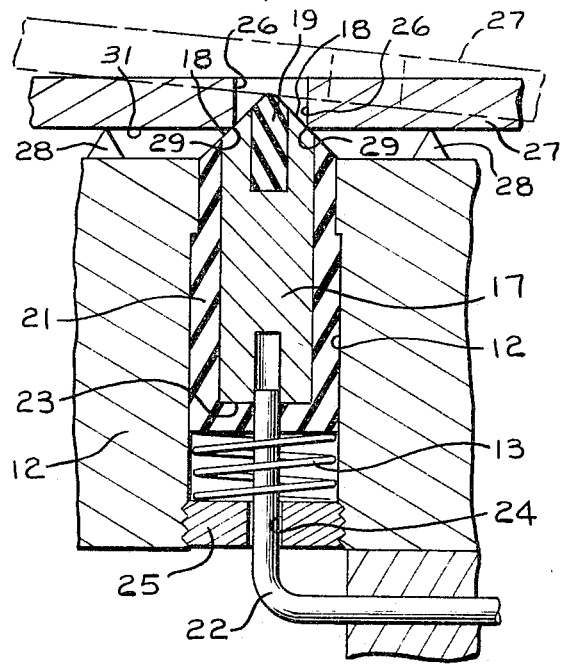
FIG. 2 is an enlarged sectional view of the test probe in FIG. 1, illustrating the spatial relationship of the test probe with respect to both properly positioned stock and improperly positioned stock.

As may be seen more clearly in FIG. 2, the test probe 10 includes a generally cylindrical body member 17 having one end 18 shaped in the form of a truncated core. The body member 17 is of electrically conductive material, preferably one which is non-magnetic, such as stainless steel. A conical insert 19 is mounted on the truncated conical end 18 of the body member 17 to form the apex thereof, the conical insert 19 being of electrically non-conductive material, preferably one which is wear resistant, such as nylon or Teflon. The body portion 17 is encased in an insulating sleeve 21 and mounted in the guide chamber 11 of the lower die portion 12 so that the body member is electrically insulated from the punch press. An electrical conductor 22 is connected to the body portion 17 at its remote end 23, which conductor has access to the outside of the lower die portion 12 by any suitable means, such as the channel 24 in retaining cap 25.

The outer diameter of the body member 17 is made substantially greater than the diameter of a pilot bore 26 in metal stock 27 fed to the press, as shown in FIG. 2. The truncated section of the body member 17, however, has a diameter less than that of the bore 26, the maximum diameter of the conical insert being equal to the diameter of the truncated section.

In addition, the test probe 10 is mounted in the lower die cavity 12 so that it protrudes a prescribed distance beyond the stock-receiving surface 16 in FIG. 1 (indicated as stock risers 28—28 in FIG. 2). This distance must be sufficient to permit properly positioned stock 27 to receive the conical insert 19 within the pilot bore 26 and permit the peripheral edges 29 of the bore 26 to engage the truncated conical end 18 of the body member 17. As is indicated in phantom lines in FIG. 2, the under surface 31 of improperly positioned stock engages the conical insert 19 instead of the body member 17.

With this construction of the test probe 10, an electrical circuit may be completed through the electrically conductive body member 17 and the properly positioned stock 27 as a result of the contact established between the peripheral edge 29 and the truncated conical end 18. This circuit is not completed when the surface 31 surrounding the bore 26 engages the conical insert 19 since the insert is electrically non-conductive.

Figure 3:
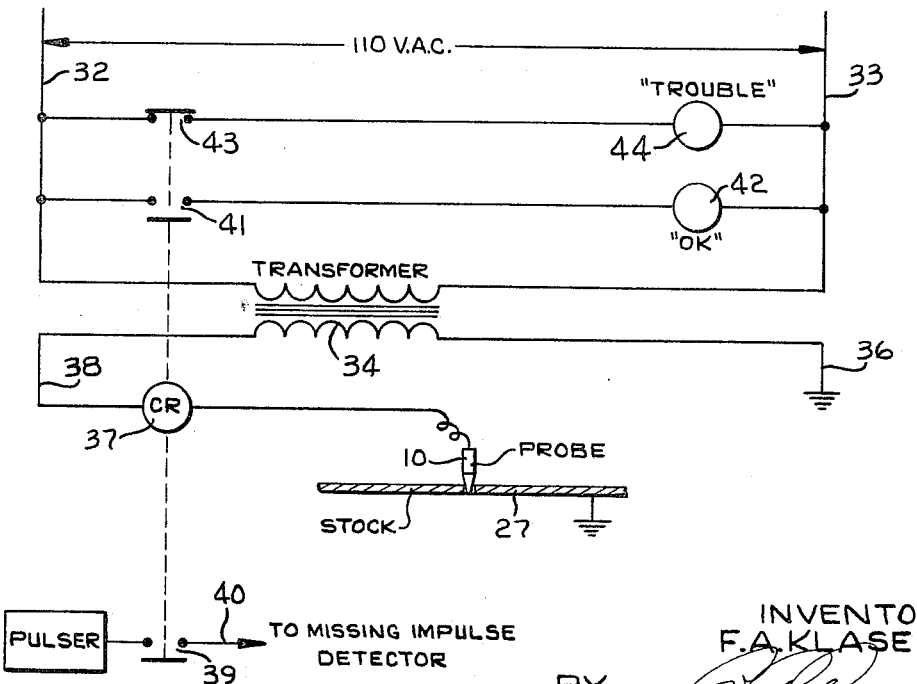
FIG. 3 is a schematic diagram of a suitable electrical circuit employing the subject test probe, which circuit may be used to control the operation of the press.

A suitable electrical circuit employing the test probe 10 is shown in FIG. 3. In this circuit, power is supplied through conductors 32 and 33 to the primary coil of a transformer 34. The secondary coil of the transformer 34 is grounded to the punch press at one terminal 36 and connected to a control relay 37 through its other terminal 38. Engagement of the stock 27 with the electrically conductive body member 17 of the test probe completes the secondary circuit of the transformer 34 to energize the control relay 37, all as clearly shown in FIG. 3. The control relay 37 may be utilized directly to condition the press clutch when energized so that the ram continues in its cycle into the down-stroke. Failure to energize the control relay, on the other hand, may be utilized to activate or deactivate the clutch, as required, to arrest the ram prior to commencement of its down-stroke.

In a preferred embodiment, the test probe 10 is utilized in conjunction with a missing impulse press control, such as the control known commercially as the DI-MATIC System. The missing impulse control requires a prescribed number of electrical impulses to keep it and the press clutch operating. Each impulse is provided by a separate detector designed to safeguard against a particular malfunction such as failure of a part to be transferred, mislocation of the part, stock buckling, material pile-ups, etc. When one such impulse is missed within a press cycle, the control sends an electrical signal which activates (or deactivates) the clutch and stops the press ram.

In the preferred embodiment, energization of the control relay 37 is utilized to close normally open contacts 39 in the missing impulse control to permit an impulse to flow through conductor 40. The control relay 37 also closes normally open contacts 41 in series with an "OK" lamp 42 connected across the conductors 32 and 33, and opens normally closed contacts 43 connected in series with a "trouble" lamp 44 also across the conductors 32 and 33.

The detector probe 10 is shown in FIG. 2 in a preferred application of detecting improper positioning of stock within a punch press. In such application, power is supplied from the press to the conductors 32 and 33 only during the period of rotation of the fly wheel from 270° to 360°, 360° being the point within the press cycle at which the down-stroke of the ram commences. Thus the test probe is sensitive only during this period, and if the stock is properly positioned, the "OK" lamp will be lit and the ram permitted to continue into its down-stroke; whereas, if the stock is improperly positioned, the "trouble" lamp will be lit and the ram stopped.

While only one detector is shown in FIGS. 1 and 2, it is obvious that where the nature of the workpiece or positioning requirements make a single detector inadequate, a plurality of detectors may be discretely located so as to be cooperable with pilot apertures in the workpiece to accurately detect improper positioning. In addition, the versatility of a detector which is cooperable with a pilot bore in the stock, makes it possible to utilize the test probe 10, or a plurality thereof, also to detect premature termination of stock and buckling of stock.

For example, premature termination of stock may be detected by a test probe 10 positioned near the feed-entrance to the press so as to be cooperable with pilot or feed holes in the stock. It is obvious that if premature termination of the stock occurs, the body member 17 of the test probe 10 cannot engage the stock, and therefore an electrical circuit will not be completed. Buckling of the stock may be indicated by positioning a pair of test probes in spaced relation within the critical area of the press so as to be cooperable with correspondingly spaced pilot holes in the stock. In this instance, buckling of the stock will shorten the distance between the two pilot holes and as a consequence one or both of the test probes 10 will be unable to complete an electrical circuit.

All three of the above applications for the test probe 10 may be utilized in combination with the missing impulse control on a single punch press to guard against the corresponding malfunctions. When any of the test probes detect a malfunction, a necessary impulse is withheld from the control and the punch press is stopped instantaneously before damage can occur since the ram has not yet begun its down-stroke. It is apparent, therefore, that the abovedescribed test probe provides an improved detection device which may be advantageously employed in punch presses and the like to prevent costly damage to dies, to save raw materials, and to reduce down-time.

While a preferred embodiment is described in detail hereinabove, various modifications may be made without departing from the spirit and scope of the invention, and it is intended that all such modifications be interpreted as contemplated by the invention.

What is claimed is:

1. A test probe for use in an electrical control circuit for detecting improper positioning of metal stock within a punch press, the stock having a pilot bore therethrough, which test probe comprises:

a generally cylindrical body member of electrically conductive material, said body member having an end shaped in the form of a truncated cone, the truncated section of said body member having a diameter less than that of the bore in the stock and said body member having an outer diameter substantially larger than that of the bore;

a generally conical insert of electrically non-conductive material mounted on said body member to form the apex of the truncated conical end thereof, the maximum diameter of said conical insert being substantially equal to the diameter of the truncated section of said body member;

resilient means for mounting said body member in the punch press and biasing the body member to a position in alignment with the bore in properly positioned stock so that properly positioned stock will receive said conical insert within the bore to a depth sufficient to permit the truncated conical end of said body member to engage the peripheral edges of the bore and so that improperly positioned stock will engage said conical insert and prevent said body member from engaging the stock;

whereby an electrical circuit may be completed through said body member and the metal stock only when the stock is properly positioned so as to receive said conical insert within the bore to the proper depth.

2. A device for use in conjunction with an electrical circuit for detecting misalignment within a machine of a metal workpiece having a pilot aperture therein, which comprises:

an electrically conductive member having a cross-sectional area greater than that of the pilot aperture in the workpiece and having an end portion;

a dielectric element mounted centrally on and projecting from said end portion of said member and having a cross-sectional area conforming to that of the pilot aperture and of a size which fits into the aperture and which leaves marginal surfaces of said end portion of said member engageable with the workpiece; and resilient means for supporting said member yieldably in a predetermined position in the machine and in insulated relation thereto and for limited movement relative thereto and transversely of a work supporting surface of the machine for engagement with a workpiece placed in the machine, so that with the placement of a properly aligned workpiece in the machine the dielectric element fits within the aperture of the workpiece and said end of said member engages the workpiece and establishes an electrical circuit therethrough, and with the placement of a misaligned workpiece in the machine said dielectric element engages the workpiece and maintains said member in spaced and insulated relation thereto.

References Cited by the Examiner

UNITED STATES PATENTS

| 2,417,681 | 3/1947 | Frank | 33—180 X |
| 2,433,743 | 12/1947 | Dickens. | |
| 2,553,129 | 5/1951 | Burnett | 33—174 |

LEONARD FORMAN, *Primary Examiner.*

SAMUEL S. MATTHEWS, *Examiner.*